Inventors
John Walter Davis
Kenneth John Wells

By: Scrivener and Parker
Attorneys

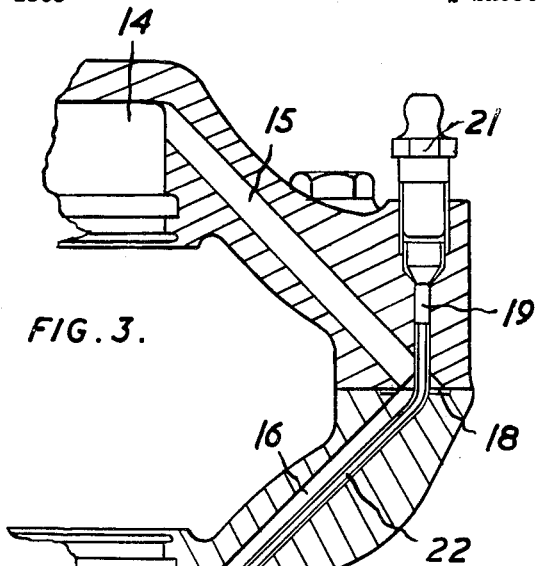
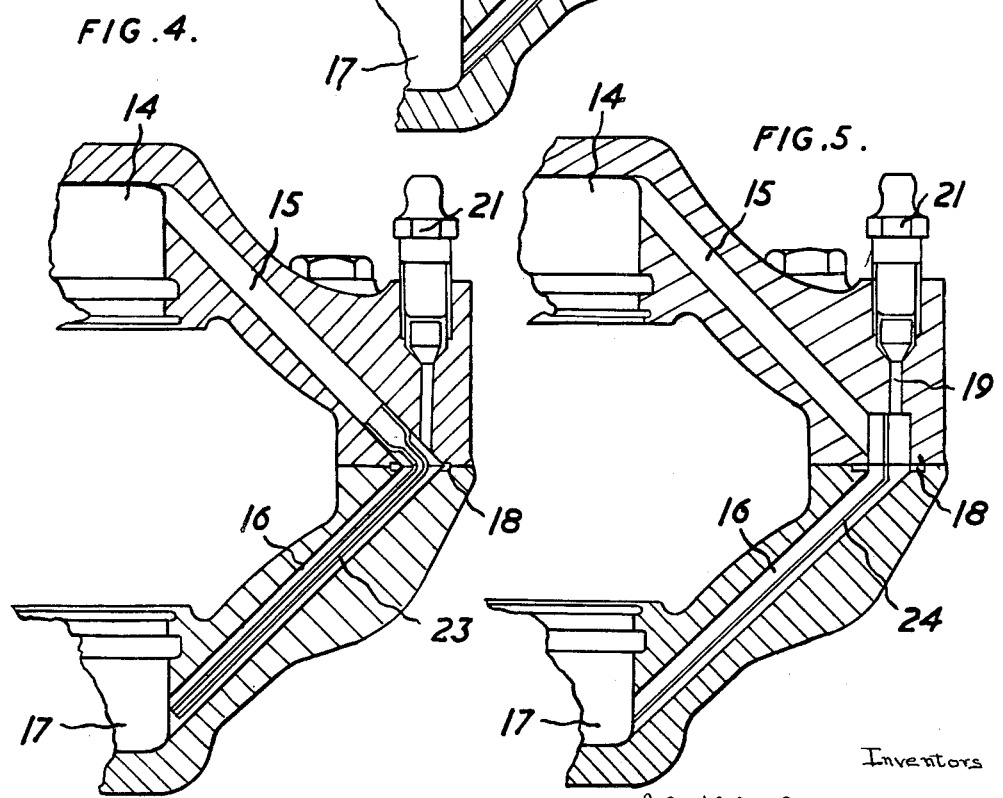

United States Patent Office 3,221,844
Patented Dec. 7, 1965

3,221,844
HYDRAULICALLY OPERATED DISC BRAKES
John Walter Davis, Birmingham, and Kenneth John Wells, Castle Bromwich, England, assignors to Girling Limited, Birmingham, England, a British company
Continuation of application Ser. No. 277,273, May 1, 1963. This application Feb. 11, 1965, Ser. No. 448,198
2 Claims. (Cl. 188—152)

This invention relates to improvements in hydraulically operated disc brakes of the kind in which friction pads are applied to opposite faces of a disc rotating with a vehicle wheel by pistons working in opposed hydraulic cylinders in a fixed caliper which straddles a portion of the disc; and this application is a continuation of our prior application Serial No. 277,273, filed May 1, 1963.

The disc is usually mounted on the inboard side of and close to the wheel.

In all hydraulic systems it is essential to ensure that the system is completely filled with liquid and any air in the system has to be bled off through external bleed screws.

It is known to feed hydraulic fluid into a cylinder in one limb of the caliper and to provide an internal passage in the caliper which connects this cylinder to a cylinder in the second limb of the caliper, the passage communicating with a bleed screw. Hydraulic fluid fed into the cylinder in the first limb first fills that cylinder and then overflows through the passage into the cylinder in the second limb, from which the air is driven through the bleed screw. This arrangement has the disadvantage that, when the system is being filled, air in the second cylinder cannot pass freely to the bleed screw, because its flow is impeded by liquid flowing from the first to the second cylinder.

This disadvantage is avoided by the present invention according to which the bleed screw is connected to the outer end of the cylinder in the second limb by an independent pipe or passage. The passages between the bleed screw and the cylinders may be arranged in various ways.

Some of these are illustrated by way of example in the accompanying drawings in which:

FIGURES 3, 4 and 5 are sections of the caliper on the line 3—3 of FIGURE 2 showing various ways of arranging the internal passages.

Figure 1:
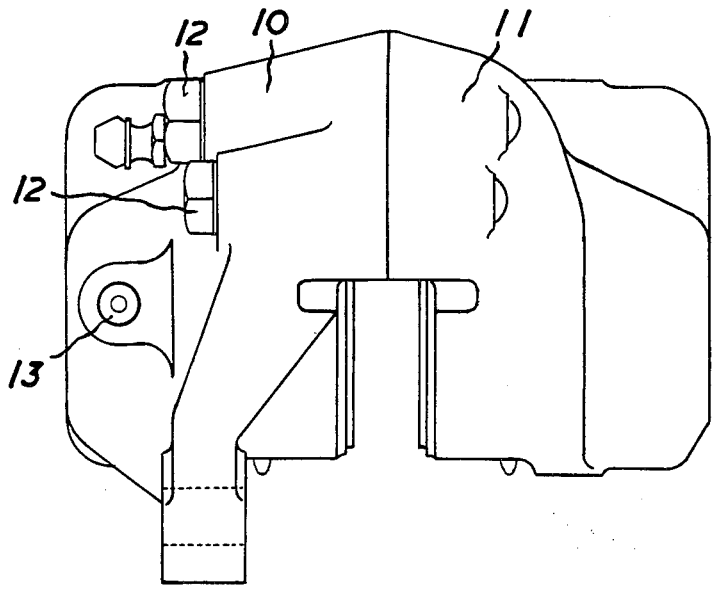
FIGURE 1 is an end elevation of a brake caliper.

The caliper illustrated is formed in two complementary halves 10, 11 secured together by bolts 12, the joint being in the central plane of the disc with which the caliper co-operates. A union 13 to receive a pipe from a master cylinder is located on the limb 10 of the caliper which is on the inboard side of the disc when the caliper is in position, a passage leading from the union into the hydraulic cylinder 14 in that limb. Inclined bores 15, 16 are drilled from the meeting faces of the two halves of the caliper into the outer end of the cylinder 14 and the outer end of the cylinder 17 in the other limb of the caliper. The inner ends of the passages register and one face is recessed as shown at 18 to receive an annular seal.

A bleed bore 19 of smaller diameter than the bores 15, 16 is drilled in the inboard limb 10 of the caliper substantially parallel to the axis of the disc. The inner end of this passage meets the inner ends of the passages 15, 16 and its outer end is normally closed by a bleed screw 21.

Figure 2:
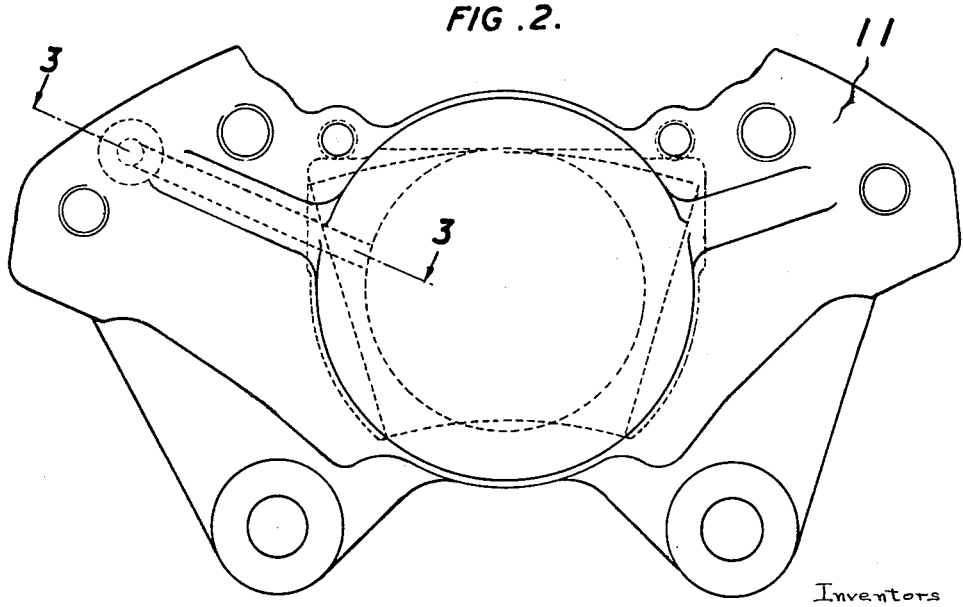
FIGURE 2 is a side view of the caliper.

The angular disposition of the passages 15, 16 is conveniently such that they communicate with the outer ends of the cylinders at points above the axes of the cylinders and the passages are inclined upwardly towards their junction and towards the inner end of the bleed passage 19 as shown in dotted lines in FIGURE 2.

In the embodiment shown in FIGURE 3 a tube 22 of small bore extends from the bleed passage 19 through the passage 16 to its junction with the cylinder 17. Thus, when filling the system with liquid through the union, air from the cylinder 14 and surplus liquid from that cylinder flows into the cylinder 17 through the passages 15, 16 and the air is discharged through the tube 22 and the bleed passage 19, filling being continued until liquid free of air comes from the bleed screw.

From the above description it will be apparent that the first limb 10 of the caliper has an inlet connection 13 for liquid to its cylinder 14, an outlet connection 15 for liquid from its cylinder 14, and a bleed connection 19, and the second limb 11 of the caliper has an inlet connection 16 for liquid to its cylinder 17, and an outlet connection 22 for liquid from its cylinder 17, the outlet 15 from said first limb being connected to the inlet 16 of the second limb and the outlet 22 from the second limb leading into the bleed connection 19 of the first limb.

In the modification shown in FIGURE 4 one end of a tube 23 is cranked and flared to fit into the outer end of the passage 15, and the tube, which is of smaller diameter than the passage 16, extends through that passage to its junction with the cylinder 17. Thus air and liquid from the cylinder 14 are delivered through the passage 16 and the tube 23 into the cylinder 17 and the air from both cylinders flows out through the passage 16 around the tube 23 and through the bleed passage 19.

In this arrangement the tube 23 forms the inlet connection to the cylinder 17 in the second limb 11 of the caliper and the passage 16 forms the outlet connection from the cylinder 17 leading into the bleed connection 19.

In the modification shown in FIGURE 5 the passage 16 is divided longitudinally by a partition 24, the part of the passage on one side of the partition being in communication with the passage 15 and the cylinder 17, and the part on the other side connecting the cylinder 17 with the bleed passage 19.

In this arrangement a part of the passage 16 on one side of the partition 24 forms the inlet connection to the cylinder 17 in the second limb 11 of the caliper and the part on the other side of the partition forms the outlet connection from the cylinder 17 leading into the bleed connection 19.

We claim:

1. A hydraulic disc brake of the kind in which friction pads are applied to opposite faces of a disc rotatable with the vehicle wheel by pistons working in fixed cylinders in the limbs of a fixed caliper which straddles a portion of the disc, said caliper comprising two complementary halves bolted together, the two bores drilled from the meeting faces of the two halves to the outer ends of the cylinders, a third bore closed by a bleed screw drilled in one half to meet one of the two bores, an inlet means through which liquid is fed into a cylinder in one limb of the caliper and means forming two passages within the bore in the other limb of the caliper, one of said passages extending between the outer end of the cylinder in said other limb and the bore in the first limb and the other of said passages extending between the outer end of the cylinder in said other limb and said third bore.

2. A hydraulic disc brake of the kind in which friction pads are applied to opposite faces of a disc rotatable with a vehicle wheel by pistons working in the limbs of a fixed caliper which straddles a portion of the disc, the said caliper comprising first and second parts secured together and respectively incorporating first and second hydraulic cylinders, two bores one in each part, extending from the meeting faces of the two parts to the cylinders, a third bore in said first part normally closed by a bleed screw and meeting one of said two bores, an inlet means through which liquid under pressure is fed to said first cylinder, and means forming two passages within the bore in said second part, one of said passages within the bore extending between said second cylinder and the bore in the first part and the other of said passages extending between said second cylinder and the third bore.

References Cited by the Examiner

UNITED STATES PATENTS 2,957,553  10/1960  Chouings et al. _____ 188—73
3,077,954  2/1963   Ihnacik _____ 188—218

FOREIGN PATENTS 1,281,582  12/1961  France.

MILTON BUCHLER, *Primary Examiner.*